United States Patent
Hattori et al.

(10) Patent No.: US 6,878,445 B2
(45) Date of Patent: Apr. 12, 2005

(54) NANOPARTICLE COATED MATERIAL AND PRODUCTION METHOD OF SAME

(75) Inventors: Yasushi Hattori, Kanagawa (JP); Koukichi Waki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 110 days.

(21) Appl. No.: 10/382,983

(22) Filed: Mar. 7, 2003

(65) Prior Publication Data

US 2003/0215634 A1 Nov. 20, 2003

(30) Foreign Application Priority Data

Mar. 8, 2002 (JP) .......................................  2002-063474
Mar. 8, 2002 (JP) .......................................  2002-063476

(51) Int. Cl.$^7$ ................................................ B32B 5/16
(52) U.S. Cl. ................ 428/402; 428/403; 428/684 BA; 427/128; 427/130; 427/131
(58) Field of Search ................................. 428/402, 403, 428/684 BA; 427/128, 130, 131

(56) References Cited

U.S. PATENT DOCUMENTS 6,162,532 A * 12/2000 Black et al. ................ 428/323
6,262,129 B1 * 7/2001 Murray et al. ................ 516/33
2002/0068187 A1 * 6/2002 O'Connor et al. .......... 428/546

* cited by examiner

Primary Examiner—Leszek B Kiliman
(74) Attorney, Agent, or Firm—Sughrue Mion, PLLC

(57) ABSTRACT

The invention provides a method of producing a nanoparticle coated material, comprising a support and a nanoparticle layer formed on the support, wherein the nanoparticle layer contains nanoparticles comprising a CuAu type or $Cu_3Au$ type hard magnetic ordered alloy, and wherein the method satisfies at least one of the following conditions (i) and (ii): (i) the method comprises the steps of forming a shielding layer on the support before forming the nanoparticle layer; and (ii) a step of forming the nanoparticle layer comprises: the steps of applying a coating liquid containing nanoparticles capable of forming a CuAu type or $Cu_3Au$ type hard magnetic ordered alloy phase on the support to form a coating film; and irradiating laser light on the coating film.

11 Claims, No Drawings

NANOPARTICLE COATED MATERIAL AND PRODUCTION METHOD OF SAME

BACKGROUND OF THE INVENTION

1. Field of Invention

The present invention relates to a nanoparticle coated material capable of being used in a magnetic recording medium MRAM and the like and a method of producing the nanoparticle coated material.

2. Description of the Related Art

It is necessary to decrease a particle size of a magnetic material for use in a magnetic recording medium in order to increase a magnetic recording density. For example, in the magnetic recording medium which has widely been used as video tape, computer tape, a disk and the like, in a case in which mass of a ferromagnetic material is same, a level of noise is decreases, as the particle size becomes smaller.

A CuAu type or $Cu_3Au$ type hard magnetic ordered alloy has high crystalline magnetic anisotropy due to strain generated at the time of being ordered and exhibits a hard magnetic property even when a particle size thereof is allowed to be small (i.e., even in a state of a so-called nanoparticle), thereby being a promising material for enhancing the magnetic recording density.

When a metal nanoparticle capable of forming the CuAu type or $Cu_3Au$ type hard magnetic ordered alloy is formed, a structure thereof becomes a face-centered cubic system. The face-centered cubic system ordinarily exhibits a soft magnetic property or a paramagnetic property. A material which is soft magnetic or paramagnetic is not appropriate for an application of a recording medium.

Accordingly, in order to obtain a hard magnetic ordered alloy having a coercive force of 95.5 KA/m or more, it has been necessary to perform a heat treatment on the material at a temperature of 500° C. or more.

However, it was difficult to disperse particles, having a diameter of from 1 nm to 100 nm, which were subjected to a heat treatment on a support. Further, in a case in which an organic support comprising any one member selected from the group consisting of polyesters such as polyethylene terephthalate and polyethylene naphthalate; polyolefins; cellulose triacetate; polycarbonate; polyamides (inclusive of aliphatic polyamides and aromatic polyamides such as aramids); polyimide; polyamideimide; polysulfone; polybenzoxazole and the like was used, there were problems with thermal resistance of the support when a magnetic recording medium in which metal nanoparticles were applied on the support, was subjected to a heat treatment while, in a case in which an inorganic support such as glass, alumina, Si or $SiO_2$ was used, there was also a problem of strain or the like being generated when the inorganic support was subjected to a thermal treatment. Thus, such supports as described above have not been put to practical use.

Moreover, immediately after the nanoparticles capable of forming the CuAu type or $Cu_3Au$ type hard magnetic ordered alloy were synthesized by a liquid phase method or a gas phase method, the nanoparticles were and soft magnetic or paramagnetic in a disordered phase. The nanoparticles in such state can not be used for the magnetic recording medium. In order to obtain an ordered alloy phase, it is necessary to perform an annealing treatment (thermal treatment) on the nanoparticles at about 500° to change the disordered phase of the nanoparticles into an ordered phase. However, in a case of a glass substrate or the like in which a support comprises a material containing a large quantity of an element which causes deterioration of magnetic characteristics of Si or the like, when an annealing treatment is performed on the substrate at such a high temperature as described above, the above-described element is diffused from the support in a magnetic layer (nanoparticle layer), thereby interfering with phase transformation of the alloy constituting the nanoparticles; hence, there has been a problem of deterioration of the magnetic characteristics (particularly, coercive force Hc) of the magnetic recording medium.

Further, since a temperature of transformation from the disordered phase to the ordered phase is increased, heat strain on the support and other problems occur; such cases are not desirable industrially.

Accordingly, it is an object of the present invention to provide a method of producing a nanoparticle coated material in which a nanoparticle alloy phase can efficiently be transformed into a CuAu type or $Cu_3Au$ type hard magnetic ordered alloy phase without changing quality, shape or the like of a support regardless of whether the support is an organic substance or an inorganic substance.

It is another object of the present invention to provide a magnetic recording medium which is a nanoparticle coated material that can prevent an element which deteriorates magnetic characteristics from being diffused from a support, does not increase a transformation temperature of an alloy constituting nanoparticles and shows a hard magnetic property.

SUMMARY OF THE INVENTION

As a result of an intensive study for solving the above-described problems, the present inventors have found that the above-described problems can be solved by the present invention to be described below. Namely, the invention provides a method of producing a nanoparticle coated material, including a support and a nanoparticle layer formed on the support, wherein the nanoparticle layer contains nanoparticles, which include a CuAu type or $Cu_3Au$ type hard magnetic ordered alloy, and wherein the method satisfies at least one of the following conditions (i) and (ii):

(i) the method comprises a step of forming a shielding layer on the support before forming the nanoparticle layer; and (ii) a step of forming the nanoparticle layer comprises the steps of: applying a coating liquid containing nanoparticles capable of forming a CuAu type or $Cu_3Au$ type hard magnetic ordered alloy phase on the support to form a coating film; and irradiating laser light on the coating film.

Particularly, in one aspect of the invention, the invention provides the method of producing a nanoparticle coated material, comprising the steps of forming a coating film by applying a coating liquid containing nanoparticles capable of forming a CuAu type or $Cu_3Au$ type hard magnetic ordered alloy phase on a support; and forming step of forming a nanoparticle layer by irradiating laser light on the coating film.

In another aspect of the invention, the invention provides the method that further comprising a step of forming, before the coating film forming step, a laser light absorption layer containing a laser light absorbing agent on a side of the support on which the coating film is formed.

It is preferable that the nanoparticle coated material obtained by the method of producing the nanoparticle coated material according to the invention is used in a magnetic layer of the magnetic recording medium.

In still another aspect of the invention, the invention provides a nanoparticle coated material, comprising a support, a shielding layer formed on the support and a nanoparticle layer formed on the shielding layer, wherein the nanoparticle layer comprises nanoparticles comprising a CuAu type or $Cu_3Au$ type hard magnetic ordered alloy.

DETAILED DESCRIPTION OF THE PREFERRED EMBODIMENTS

A nanoparticle coated material having a CuAu type or $Cu_3Au$ type hard magnetic ordered alloy phase is produced by way of at least producing steps (1) and (2) described below.

First, (1) nanoparticles which can form a CuAu type or $Cu_3Au$ type hard magnetic ordered alloy phase are prepared and, then, (2) a coating liquid containing the thus-prepared nanoparticles is applied on a support to form a coating film.

The nanoparticle coated material according to the present invention is produced further by way of at least one of steps (i) and (ii) in which (i) is a step of forming a shielding layer on the support and (ii) is a step of forming a nanoparticle layer by irradiating laser light on the thus-formed coating film.

For preparing such nanoparticle capable of forming the CuAu type or $Cu_3Au$ type hard magnetic ordered alloy phase (hereinafter referred to also as "nanoparticle" for the purpose of simplicity), a vapor phase method or a liquid phase method, or any other known nanoparticle forming methods can be employed. Among them, the liquid phase method is preferable when excellent mass production ability thereof is taken into consideration.

As for a solvent for use in the liquid phase method an organic solvent, water or a mixture of the organic solvent and water may be used.

As the organic solvent, an alcohol, a polyalcohol and the like maybe used whereupon examples of such alcohols include methanol, ethanol, butanol and the like while examples of such polyalcohols include ethylene glycol, glycerin and the like.

Examples of such CuAu type hard magnetic ordered alloys include FeNi, FePd, FePt and CoPt. Among them, FePd, FePt and CoPt are preferable. Above all, FePt is particularly preferable, since it is largest among them in magnetic anisotropy constant.

Examples of such $Cu_3Au$ type hard magnetic ordered alloys include $Ni_3Fe$, $FePd_3$, $Fe_3Pt$, $FePt_3$, $CoPt_3$, $Ni_3Pt$, $CrPt_3$ and $Ni_3Mn$. Among them, $FePd_3$, $FePt_3$, $CoPt_3$, $Fe_3Pd$, $Fe_3Pt$ and $Co_3Pt$ are preferably used.

There are various types of methods in preparing nanoparticles by the liquid phase method. It is preferable to apply a method of reducing at least a metal base in oxidation-reduction potential (hereinafter referred to also as "base metal" for the purpose of simplicity) and a metal noble in oxidation-reduction potential (hereinafter referred to also as "noble metal" for the purpose of simplicity) in a liquid phase in the presence of a reducing agent and the like.

A reducing sequence of the base metal and the noble metal is not particularly limited, but both metals may simultaneously be reduced.

Further, as for a method in which a noble metal is first precipitated to prepare nanoparticles, methods described in paragraphs [0018] to [0030] of Japanese Patent Application No. 2001-269255 and the like may be applied.

As for such metals noble in the oxidation-reduction potential, Pt, Pd, Rh and the like can preferably be used whereupon the metals can be used by dissolving $H_2PtCl_6.6H_2O$, $Pt(CH_3COCHCOCH_3)_2$, $RhCl_3.3H_2O$, $Pd(OCOCH_3)_2$, $PdCl_2$, $Pd(CH_3COCHCOCH_3)_2$ and the like in a solvent. A concentration of the metal in a solution is preferably from 0.1 µmol/ml to 1000 µmol/ml and more preferably from 0.1 µmol/ml to 100 µmol/ml.

Further, as for such metals base in the oxidation-reduction potential, Co, Fe, Ni and Cr can preferably be used and, among them, Fe and Co are particularly preferably be used whereupon the metals can be used by dissolving $FeSO_4.7H_2O$, $NiSO_4.7H_2O$, $CoCl_2.6H_2O$, $Co(OCOCH_3)_2.4H_2O$ and the like in a solvent. A concentration of the metal in a solution is preferably from 0.1 µmol/ml to 1000 µmol/ml and more preferably from 0.1 µmol/ml to 100 µmol/ml.

In a case of an alloy comprising two elements, it is preferable to add a third element such as Sb, Pb, Bi, Cu, Ag or Zn thereto, thereby reducing a temperature of transformation into a hard magnetic ordered alloy. A quantity of the third element to be added is, based on an entire weight (two-element alloy plus third element), preferably from 1 at % to 20 at % and more preferably from 5 at % to 15 at %.

Take, for example, a case in which a base metal and a noble metal are reduced in this order by using a reducing agent to allow them to be precipitated. It is preferable that the base metal or the base metal and a part of the noble metal are reduced by a reducing agent having a reduction potential baser than −0.2 V (vs. N.H.E.) and, then, the resultant reduction article is added to a noble metal source and, thereafter, the resultant mixture is reduced first by using a reducing agent having an oxidation-reduction potential nobler than −0.2 V (vs. N.H.E) and, then, by using a reducing agent having a reduction potential baser than −0.2 V (vs. N.H.E).

Further, the reducing agent may be used in order to precipitate the base metal, but a zero-valent compound comprising the base metal may be added. Examples of such zero-valent compounds include a metal carbonyl.

Although the oxidation-reduction potential depends on a pH of a system, as for the reducing agent nobler than −0.2 V (vs. N.H.E), alcohols such as 1,2-hexadecane diol, glycerin, $H_2$ and HCHO are favorably used.

As for the reducing agent baser than −0.2 V (vs. N.H.E), $S_2O_6^{2-}$, $H_2PO_2^-$, $BH_4^-$, $N_2H_5^+$ and $H_2PO_3^-$ are favorably used. Further, when the zero-valent compound such as Fe carbonyl is used as a starting material of the base metal, the reducing agent for the base metal is not necessarily used.

At the time of reduce-precipitating the noble metal, the nanoparticles can consistently be formed by allowing an adsorbent to be present. As for such adsorbents, a polymer, a surfactant and the like are preferably used. Examples of such polymers include polyvinyl alcohol (PVA), poly-N-vinyl-2-pyrrolidone (PVP) and gelatin. Among them, PVP is particularly preferable.

A molecular weight thereof is preferably from 20000 to 60000 and more preferably from 30000 to 50000. A quantity of the polymer is preferably from 0.1 time to 10 times and more preferably from 0.1 time to 5 times the quantity of hard magnetic nanoparticles to be formed.

It is preferable that the surfactant to be favorably used as ah adsorbent contains an "organic stabilizer" which is a long-chain organic compound represented by the general formula: R—X. In the above general formula, R represents a "tail group", which is a linear or branched hydrocarbon or fluorocarbon chain, ordinarily having from 8 to 22 carbon atoms. Further, in the above general formula, X represents a "head group" which is a part (X) that provides a specific chemical bonding on a surface of a nanoparticle and is preferably any one member selected from the group consisting of a sulfinate (—SOOH), a sulfonate (—$SO_2OH$), a phosphinate (—POOH), a phosphonate (—OPO(OH)$_2$), a carboxylate and a thiol.

The organic stabilizer is preferably any one member selected from the group consisting of a sulfonic acid (R—$SO_2OH$), a sulfinic acid (R—SOOH), a phosphinic acid ($R_2POOH$), a phosphonic acid (R—$OPO(OH)_2$), a carboxylic acid (R—COOH), a thiol (R—SH) and the like and, among them, oleic acid is particularly preferable.

Oleic acid is a well known surfactant in stabilizing colloid and is favorably used for protecting an iron type nanoparticle. Oleic acid has a chain of 18 carbon atoms and is about 20 angstroms (about 2 nm) in length. Further, oleic acid does not belong to a fatty series and has one double bond therein. Still further, a relative long chain of oleic acid gives an important steric hindrance which cancels a strong magnetic interaction between particles.

Similar long-chain hydrocarbons such as erucic acid and linoleic acid have been used in a same manner (for example, long-chain organic acids each having carbon atoms of between 8 and 22 can be used either alone or in combinations thereof.) as in oleic acid. Oleic acid (for example, in a state of olive oil) is preferable, since it is an easily-obtainable low-priced natural resource.

A combination of a phosphine and the organic stabilizer (for example, combination of tri-organo-phosphine and acid) provide(s) an excellent control on growth and stabilization of particles. Although didecyl ether and didodecyl ether can be used, phenyl ether or n-octyl ether can also favorably be used as a solvent because of a low cost and high boiling point thereof.

Though depending on the type of nanoparticles to be required and a boiling point of a solvent, a reaction can be performed at a temperature in a range of from 80° C. to 360° C. and preferably in a range of from 80° C. to 240° C. When the temperature is lower than the range, the particle does not grow in some cases, while, when the temperature is higher than the range, the particle grows without being controlled, thereby sometimes increasing formation of an undesirable byproduct.

Coercive force of nanoparticles to be obtained is preferably from 95.5 kA/m to 398 kA/m (from 1200 Oe to 5000 Oe) and, in order to allow a recording head to correspond when the nanoparticles are applied to a magnetic recording medium, the coercive force is more preferably from 95.5 kA/m to 278.6 kA/m (from 1200 Oe to 3500 Oe). A particle diameter of nanoparticles is preferably from 1 nm to 100 nm, more preferably from 3 nm to 20 nm and still more preferably from 3 nm to 10 nm.

As for a method which increases a particle size (particle diameter), a seed crystal method is effective. Nanoparticles for use in the magnetic recording medium is preferably close-packed from the standpoint of increasing recording capacity. To that end, a standard deviation of sizes of nanoparticles is preferably less than 10% and more preferably 5% or less.

When the particle size is unduly small, nanoparticles become superparamagnetic; this case is not preferable. Accordingly, in order to increase the particle size, it is preferable to apply the seed crystal method as described above. On this occasion, a case occurs in which a metal nobler than a metal constituting the particle is allowed to be precipitated. Since there is a fear that the particle is possibly oxidized at that time, it is preferable that the particle is previously subjected to a hydrogenation treatment.

An outermost layer of nanoparticles preferably comprises a noble metal from the standpoint of prevention of oxidation, however, nanoparticles in this case are likely to be agglomerated; therefore, according to the present invention, an alloy of a noble metal and a base metal is preferably used.

It is preferable from the standpoint of enhancing dispersion stability of nanoparticles that salts are removed from a solution after nanoparticles are synthesized. For removing the salts therefrom, there is a method in which an excess of alcohol is added to form a slight agglomeration and, then, the thus-formed slight agglomeration is allowed to be precipitated either gravitationally or centrifugally and, thereafter, the salts are removed together with a supernatant liquid, however, since this method tends to form an agglomeration, adoption of an ultrafiltration method is preferable.

It is possible to use a transmission electron microscope (TEM) for conducting a particle size evaluation of nanoparticles. For determination of a crystalline system of nanoparticles, electron diffraction by the TEM may be used, however it is preferable to use X-ray diffraction because the X-ray diffraction is more accurate than the electron diffraction. For performing a composition analysis of an inside of nanoparticles, it is preferable to perform an evaluation by FE-TEM, which is capable of finely focusing electron beams, attached with EDAX. For performing evaluation of magnetic properties of nanoparticles, a VSM can be used.

The nanoparticles capable of forming the CuAu type or $Cu_3Au$ type hard magnetic ordered alloy produced by the liquid phase method or the vapor phase method is of disordered phase. The disordered phase can not obtain a hard magnetic property. Therefore, in order to be the ordered phase, a liquid containing nanoparticles is applied on the above-described support as a coating liquid and, then, it is necessary to subject the thus-applied nanoparticles to a thermal treatment such as an annealing treatment or a laser heating treatment.

It is preferable that a transformation temperature (ordinarily 500° C. or more) at which an alloy constituting nanoparticles perform order-disorder transformation is first determined by utilizing a differential thermal analysis (DTA) and, then, the annealing treatment is performed at a temperature higher than the thus-determined transformation temperature.

Since nanoparticles prepared by the liquid phase method is in a state of being dispersed in a liquid, a solvent or the like is added to the liquid as required to allow a content of the nanoparticles in the resultant solution to be from 0.01 g/l to 0.1 g/l, thereby preparing a coating liquid. The thus-prepared coating liquid is applied on the support to form a coating film. Although depending on conditions such as a content of nanoparticles, a quantity of the coating liquid to be applied is preferably from about 0.01 $g/m^2$ to about 1 $g/m^2$.

When the nanoparticles prepared by the vapor phase method is applied on the support, a coating liquid is first prepared by allowing the nanoparticles to be dispersed in a solvent by using a known kneading method or a known fine dispersion method and, then, the thus-prepared coating liquid is applied on the support in a same manner as in the liquid phase method to form a coating film.

Conditions such as a content of nanoparticles in the coating liquid are same as in the liquid phase method.

After the nanoparticles are applied on the support, a thermal treatment such as an annealing treatment or a laser heating treatment is performed to form the ordered phase. As previously described, it is preferable that a temperature of the annealing treatment to be performed after the coating is allowed to be higher than a temperature necessary for forming the ordered phase (transformation temperature) of the alloy constituting nanoparticles. The transformation temperature can be lowered by adding a third element or the like. Specifically, the temperature is preferably 150° C. or more and, taking thermal resistance of the support or the like into consideration, more preferably from 150° C. to 300° C.

Further, in an embodiment according to the invention, in order to enhance absorption efficiency of laser light to be irradiated in a nanoparticle layer forming step, it is preferable to allow a laser light absorbing agent to be contained in the coating liquid.

A content of the laser light absorbing agent in the coating film is preferably from 1 mg to 1000 mg and more preferably from 1 mg to 100 mg. By allowing the content thereof to be from 1 mass percent to 1000 mass percent, laser light is absorbed whereupon the laser light can efficiently be transformed into heat.

In a case in which the laser light absorbing agent is allowed to be contained in the coating film, when the absorbing agent is solid, an array of the nanoparticles are disturbed; accordingly, the absorbing agent is preferably in a state of molecularity. In order to allow the absorbing agent to be in a state of molecularity, it is preferable that the absorbing agent is first dissolved in a solvent and, then, applied.

As for the laser light absorbing agent, a laser light absorbing agent of same type as that which is used in a step of forming a laser light absorption layer to be described below can be used.

Either an inorganic substance or an organic substance can be used for the support; however, taking applicability for magnetic tape, floppy (R) disk and the like into consideration, it is preferable to use the organic substance for the support.

As for inorganic supports, Si, Al, an Mg alloy (Al—Mg alloy, Mg—Al—Zn alloy or the like), glass, quartz, carbon, silicon, ceramics and the like can be used. These supports are excellent in impact resistance and has rigidity suitable for a general trend toward reducing thickness thereof or performing high-speed rotation. Further, the inorganic supports have characteristics of high thermal resistance compared with the organic supports.

Examples of the organic supports include polyesters such as polyethylene terephthalate and polyethylene naphthalate; polyolefins; cellulose triacetate; polycarbonate; polyamide (inclusive of aliphatic polyamide and aromatic polyamide such as aramide); polyimide; polyamideimide; polysulfone and polybenzoxazole.

Further, it is preferable that, before the coating film is formed (before performing a step of forming the coating film), a laser light absorbing layer containing a laser light absorbing agent is formed on the support.

When the laser light absorbing layer is provided, it is preferably formed between the coating film and the support. When the laser light absorbing layer is provided on a side opposite to the support and, further, nanoparticles according to the invention are used as the magnetic recording material,
a spacing loss becomes unduly large to decrease an output; such a case is not preferable.

As for the laser light absorbing agent, it is preferable that a dye is primarily used. As for the dye, a type or two or more types in combination of compounds which are represented by any one of the following general formulas (I), (II) and (III) can be used:

General formula (I)

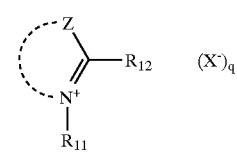

wherein Z represents a non-metallic atomic group necessary for completing a 5- or 6-membered nitrogen-containing heterocycle;

$R_{11}$ represents any one member selected from the group consisting of a hydrogen atom, an alkyl group, an alkenyl group, a substituted alkyl group and a substituted alkenyl group;

$R_{12}$ represents any one member selected from the group consisting of a hydrogen atom, a lower alkyl group and a substituted alkyl group;

X represents an acid anion; and q represents an integer of from 0 to 2.

General Formula (II)

$$D\text{-}(X)_y$$

wherein D represents a compound having a chromophore;

X represents a dissociative proton combined with D either directly or via a divalent connecting group, or a group having a dissociative proton; and y represents an integer of from 1 to 7.

General Formula (III)

$$A_1 = (L_1 - L_2) = {}_m L_{3(L4=L5)\overline{n}} A_2$$

wherein $A_1$ and $A_2$ each represent an acid nucleus necessary for forming an oxonol dye; and m and n each represent an integer of 0 or 1.

Hereinafter, dyes represented by the general formula (III) are given to illustrate the invention and should not be interpreted as limiting it in any way. It goes without saying that dyes (A) and (B) used in embodiments are also preferable illustrations.

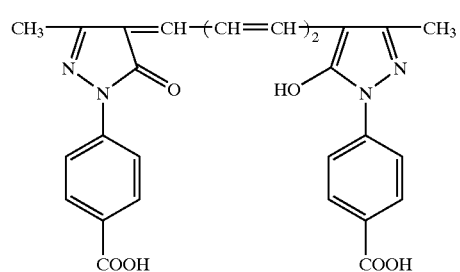

I-1

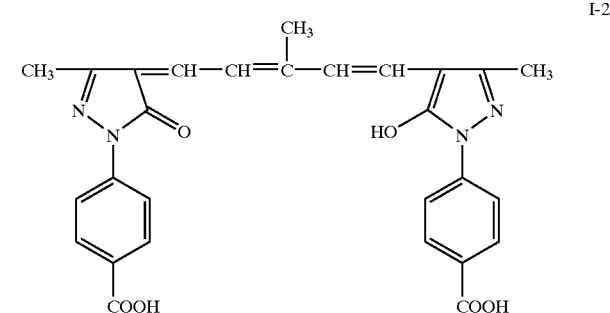

I-2

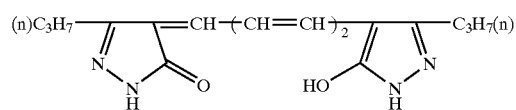
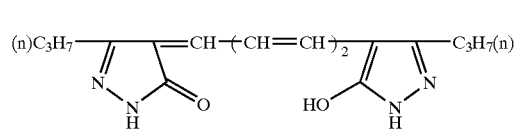
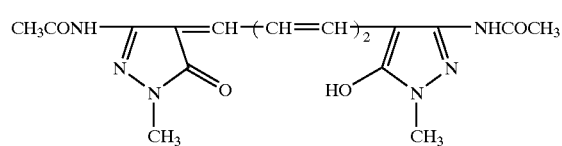
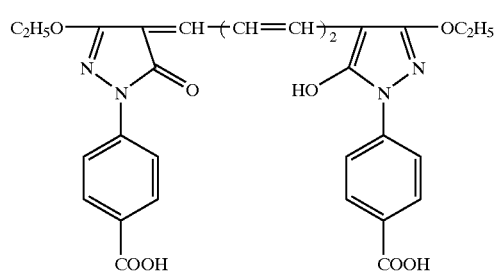
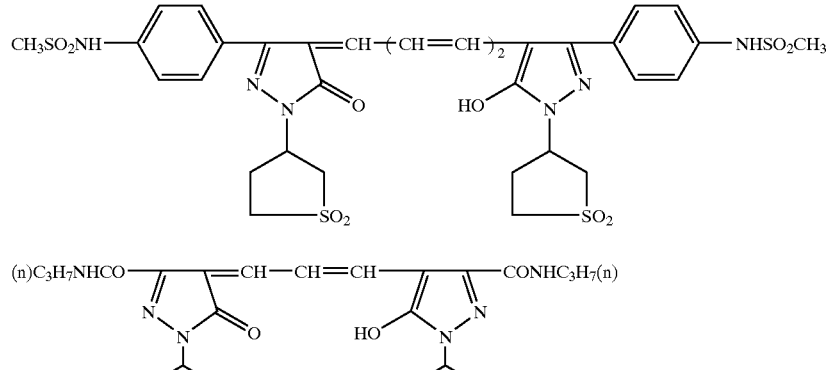
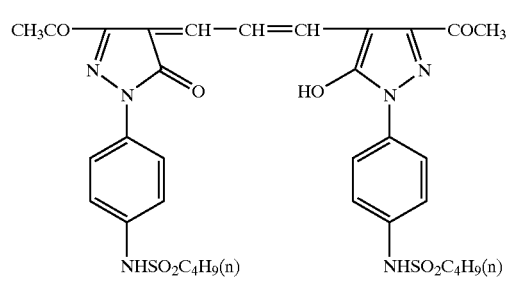
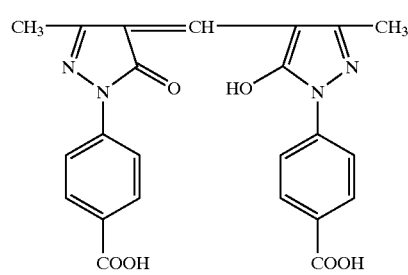

-continued
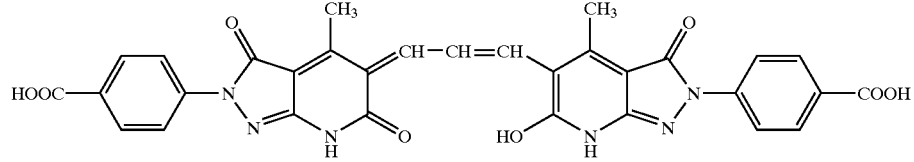
I-13
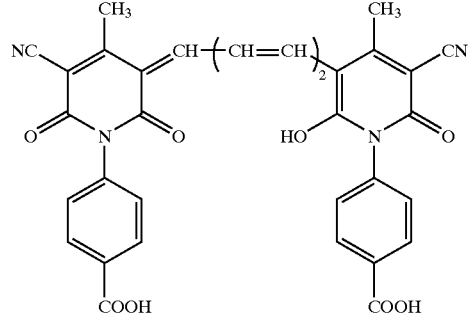
I-14
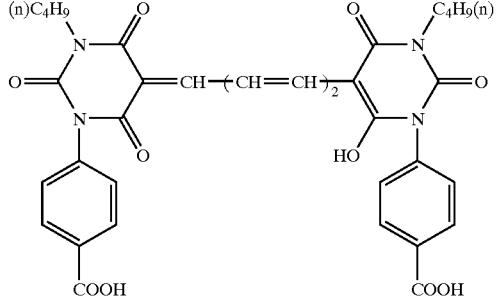
I-15
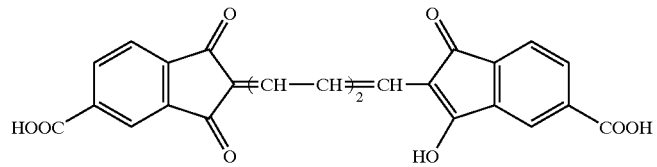
I-16
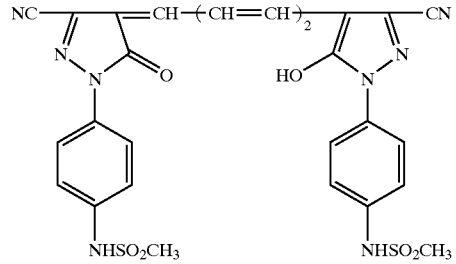
I-17
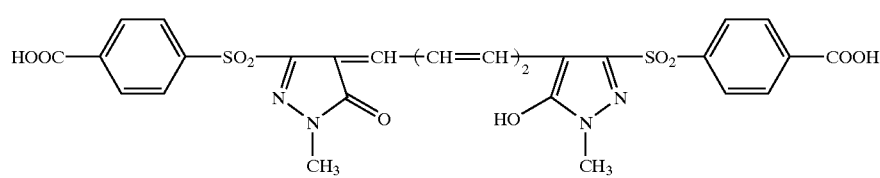
I-18
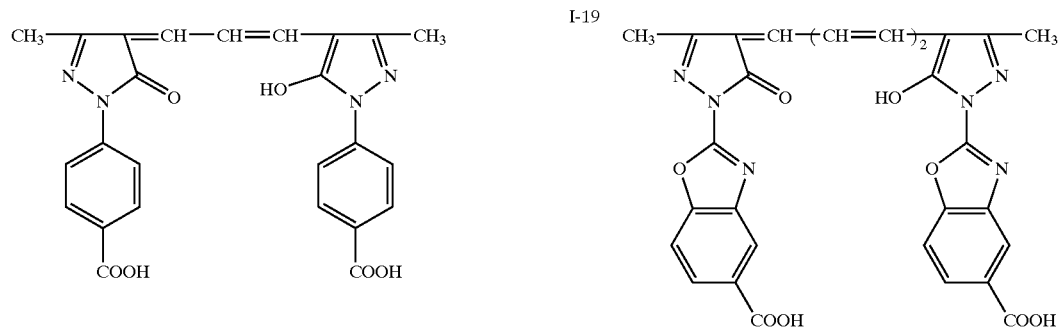
I-19 I-20
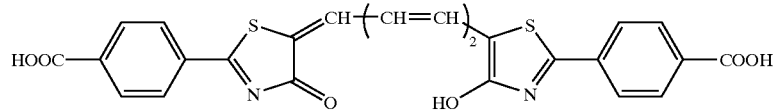
I-21

-continued
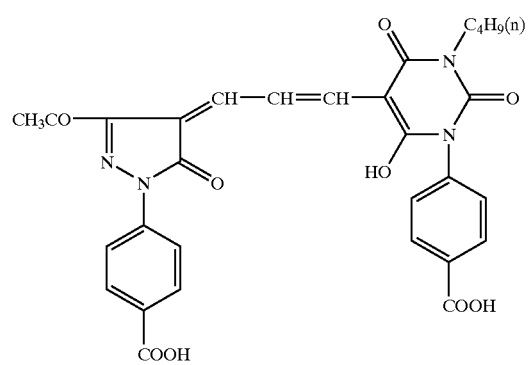
I-22
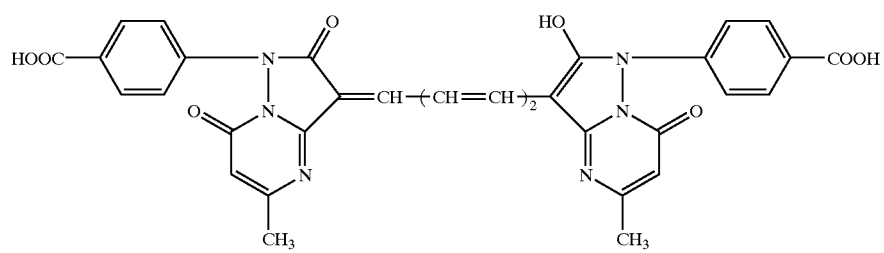
I-23
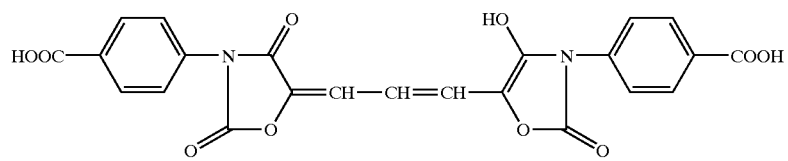
I-24
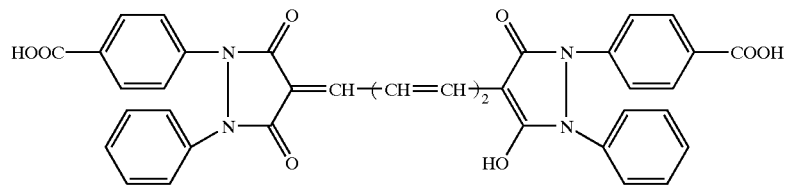
I-25
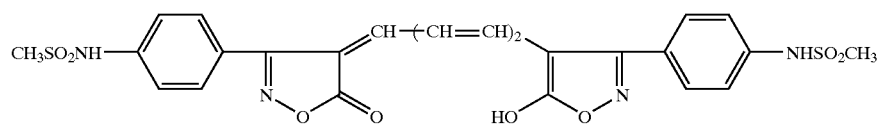
I-26
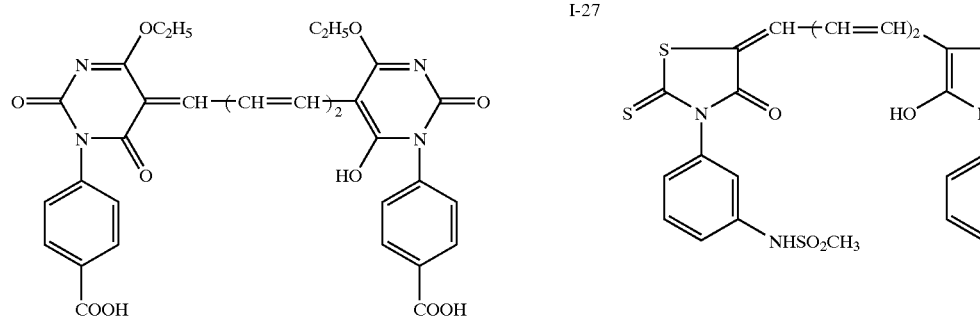
I-27
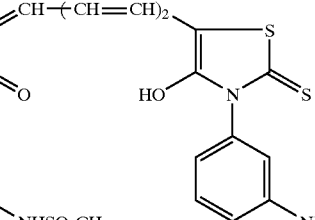
I-28
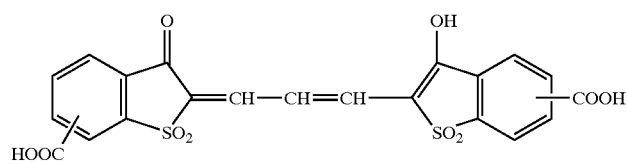
I-29

-continued

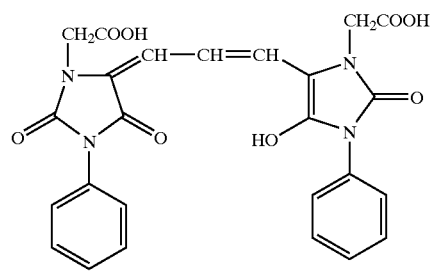
I-30

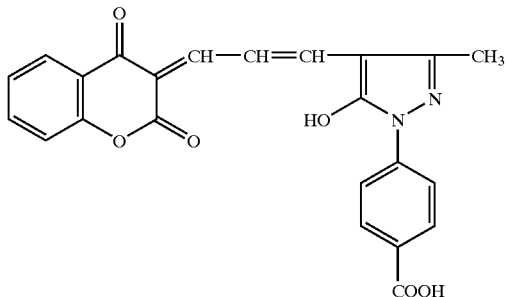
I-31

I-32

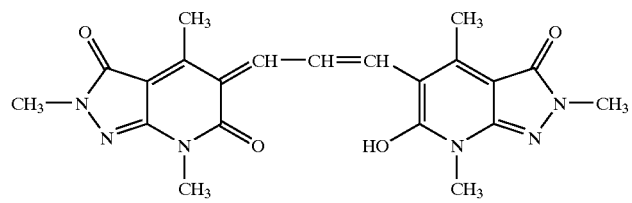
I-33

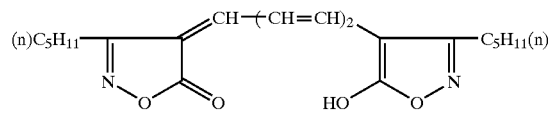
I-34

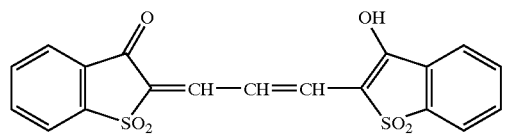
I-35

I-36

Such dyes as described above are dissolved in a solvent such as alcohol to prepare a dye solution and, then, the thus-prepared dye solution is applied on the support. As for an application method, a method which is used in forming the above-described coating film is preferably adopted. After the coating film is formed, it is preferable to appropriately perform a drying treatment and the like.

A quantity of the laser light absorbing agent to be added is, though depending on desired thickness of a laser light absorption layer to be described below, preferably from 1 $mg/m^2$ to 1 $g/m^2$ and more preferably from 10 $mg/m^2$ to 500 $mg/m^2$.

Thickness of the laser light absorption layer is, from the standpoint of laser light absorption efficiency and film strength, preferably from 50 nm to 2 $\mu m$ and more preferably from 50 nm to 0.5 $\mu m$.

(i) Step of Forming Shielding Layer

In an embodiment according to the invention, forming a shielding layer between the support and the nanoparticle layer can prevent an element which deteriorates the magnetic characteristics from being diffused from the support to the nanoparticle layer when the alloy which constitutes nanoparticles is transformed from the disordered phase to the ordered phase by a thermal treatment such as an annealing treatment. Such prevention of diffusion can efficiently form the nanoparticle layer which exhibits hard magnetic property, thereby producing a magnetic recording medium having excellent magnetic characteristics.

The term "shielding layer" herein used is intended to include a layer which prevents an element such as Si that deteriorates the magnetic characteristics from being diffused whereupon it is preferable that, as a material to be used in the shielding layer, an inorganic material substantially exclusive (1 mass percent or less) of Si is preferably used by taking thermal resistance and the like into consideration.

Examples of inorganic materials to be applicable include metals such as Pt, Au, Pd, Fe, Co, Al, Bi, Pb, Sb, Cu and Ag; carbon; ceramics such as $Al_2O_3$, $TiO_2$ and ZrO; and mixtures thereof.

Further, as for the ceramics, an entire quantity of elements such as Si, as constituting elements, which deteriorate the magnetic characteristics is preferably 1 mass percent or less. Such a low level of the entire quantity is attributable to the fact that the elements are easily diffused from the shielding layer to the nanoparticle layer by the thermal treatment such as the annealing treatment to cause deterioration of the magnetic characteristics.

When the shielding layer comprises an organic substance, the shielding layer contains oxygen and the like whereby it is feared that the shielding layer is oxidized; therefore, it is necessary that the shielding layer remains in a state of an inorganic substance at the transformation temperature of the CuAu type or $Cu_3Au$ type hard magnetic ordered alloy. Therefore, in a case in which an organic substance is used as a precursor of the inorganic material, the organic substance may be applied on the support and allowed to remain in a state of the inorganic substance during a period of annealing time before reaching the transformation temperature.

Thickness of the shielding layer is, from the standpoint of controlling diffusion of impurities from the support, preferably from 3 nm to 1 $\mu m$ and more preferably from 3 nm to 100 nm.

The shielding layer is formed on the support by a method selected from the group consisting of vapor-deposition, sputtering, coating and the like.

It is preferable that the method of forming the shielding layer may appropriately be selected, depending on the inorganic material to be used, a type of the support and the like. For example, when an organic substance is used as the precursor of the inorganic material, the shielding layer is preferably formed by vapor-deposition, while, when a metal is used as a precursor of the inorganic material, the shielding layer is preferably formed by sputtering. Further, when a substance which is susceptible to deformation or change in quality by heat is used, for example, when a support comprising an organic substance is used, it is preferable that a film which becomes the shielding layer is formed by coating and, then, the thus-formed film is dried at a relatively low temperature to form the shielding layer.

The nanoparticles capable of forming the CuAu type or $Cu_3Au$ type hard magnetic ordered alloy produced by the liquid phase method or the vapor phase method is of a disordered phase. Ordinarily, since the disordered phase can not obtain a hard magnetic property and, therefore, in order to transform the disordered phase into the ordered phase, it is necessary to subject the nanoparticles to an annealing treatment.

It is necessary that a transformation temperature at which an alloy constituting nanoparticles performs an order-disorder transformation is first determined by utilizing a differential thermal analysis (DTA) and, then, the annealing treatment is performed at a thermal treatment temperature which is equal to or higher than the thus-determined transformation temperature and, accordingly, the thermal treatment temperature is ordinarily 500° C. or more. It goes without saying that the support comprising an organic substance for use in the magnetic recording medium such as tape, floppy (R) disk or the like can not be used at a temperature higher than the transformation temperature and, therefore, the support is limited to such a support as comprising an inorganic substance. Further, when the support comprising the inorganic substance is that comprising glass, alumina, Si, $SiO_2$ or the like, there occurs a problem that strain is generated therein at the time of the thermal treatment whereupon the supports comprising these inorganic substances can not be put to practical use.

Accordingly, in an embodiment of the invention, in a step of forming a nanoparticle layer, it is preferable to perform a laser light irradiation treatment for irradiating laser light on the formed coating film. By irradiating laser light on the coating film, only nanoparticles in the coating film can selectively be heated. Therefore, even when an organic substance is used in a support, deformation or change in quality by heat can be prevented whereupon an alloy phase of nanoparticles can efficiently be transformed into an ordered phase.

As for a wavelength of the laser, those of from ultraviolet to infrared can be utilized; however, since the support comprising the organic substance has absorbance in an ultraviolet region, it is preferable to use laser light of from visible light region to infra-red region.

An output of the laser is, for the purpose of heating the coating film in a short period of time, preferably 0.1 W or more and more preferably 0.3 W or more. When the output is unduly high, it is feared that the support comprising the organic substance is vulnerable to heat and, therefore, the output is preferably 3 W or less.

Examples of favorable lasers, from the standpoint of the wavelength and the output, include an Ar ion laser, a Cu vapor laser, an HF chemical laser, a dye laser, a ruby laser, a YAG laser, a glass laser, a titanium-sapphire laser, an alexandrite laser and a GaAlAs array semiconductor laser. It should be noted that the production method according to the invention is not limited to the above illustrated lasers and various substitutes may be employed.

A linear velocity of scanning by the laser light is, for the purpose of obtaining an effect that a phase transformation is sufficiently performed while ablation is not generated, preferably from 1 m/s to 10 m/s and more preferably from 2 m/s to 5 m/s.

From the standpoint of putting no effect of heat on the support, it is preferable to provide a laser reflection layer between the support and the nanoparticle layer, or, in a case in which the laser absorption layer is present, between the laser absorption layer and the support. By such provision of the laser reflection layer, it becomes possible to cut off almost all or all of the laser light which will reach the substrate whereupon an effect of preventing the support from being deformed or changed in quality by heat can be enhanced.

A material constituting the laser reflection layer is not particularly limited so long as it can reflect the laser light. Examples of such materials include Al, Ag, Au, Cu, Mo, Ti, Cr, Ni, Pt, Ta, Pd, SiC and $Al+TiO_2$. It is preferable that the materials are each dispersed in the laser reflection layer.

The laser reflection layer can be formed by sputtering or vapor depositing any one of the above-described materials. Thickness of the laser reflection layer is preferably from 30 nm to 1000 nm and more preferably from 50 nm to 300 nm, since, when the thickness thereof is unduly thin, heat tends to be dissipated, while, when the thickness thereof is unduly thick, reflectance is deteriorated.

After laser heating is performed, the organic substance in the nanoparticle layer or the laser light absorption layer is carbonized. In order to allow these layers to be stably present, it is preferable that a bonding agent is applied on a polymer and allowed to be penetrated therein.

Examples of such bonding agents capable of being used include a polyurethane resin; a polyester type resin; a polyamide type resin; a vinyl chloride type resin; an acrylic resin prepared by copolymerizing styrene, acrylonitrile, methylmethacrylate and the like; a cellulose type resin such as nitrocellulose; an epoxy resin; a phenoxy resin; a polyvinyl alkaryl resin such as polyvinyl butyral; and mixtures thereof. Among these resins, the polyurethane resin, the polyvinyl chloride type resin and the acrylic resin are preferable.

A nanoparticle coated material obtained by a production method according to the invention can be favorably used in video tape, computer tape, a floppy (R) disk and a hard disk.

Magnetic Recording Media

A nanoparticle coated material obtained by a production method according to the invention can be favorably used in a magnetic recording medium, having at least one magnetic layer, such as a magnetic disk such as, as described above, the video tape, the computer tape, the floppy (R) disk and the hard disk; and the like.

The magnetic recording medium comprises not only the nanoparticle layer (magnetic nanoparticle layer) arranged on the nanoparticle coated material but also optionally other layers. For example, in a case of the disk, a magnetic layer or a non-magnetic layer can be provided on a surface on an opposite side of the nanoparticle layer. Further, in a case of the tape, it is preferable that a back layer is provided on a surface of an insoluble support on an opposite side of the nanoparticle layer.

For example, by forming an extremely thin protective film on the nanoparticle layer, abrasion resistance is improved and, further, by coating a lubricant on the thus-formed protective film, lubricity is enhanced whereby a magnetic recording medium having sufficient reliability can be prepared.

Examples of materials of the protective film include oxides such as silica, alumina, titania, zirconia, cobalt oxide and nickel oxide; nitrides such as titanium nitride, silicon nitride and boron nitride; carbides such as silicon carbide, chromium carbide and boron carbide; and carbon such as graphite and amorphous carbon. Hard non-crystalline carbon, generally called as diamond-like carbon, is particularly preferable.

Since a carbon protective film comprising carbon has an extremely thin thickness and sufficient abrasion resistance and is hard to cause sliding part to be seized, the carbon protective film is advantageous as a material for the protective film.

A method of forming the carbon protective film in a hard disk is ordinarily that of sputtering; however, for a product such as video tape on which a continuous film forming is necessary to be performed, a multiplicity of methods using plasma CVD which are higher in film forming speed than the sputtering method have been proposed. It is preferable that these methods are applied.

It is reported that, among other things, a plasma injection CVD (PI-CVD) method is extremely high in the film forming speed and a carbon protective film to be obtained by the method is a good-quality protective film having little pinhole (for example, JP-A Nos. 61-130487, 63-279426 and 03-113824).

The carbon protective film is, in terms of Vickers hardness, preferably 1000 Kg/mm$^2$ or more and more preferably 2000 Kg/mm$^2$ or more. Further, it is preferable that the carbon protective film has an amorphous structure as a crystalline structure and is electrically non-conductive.

Still further, when a diamond type carbon (diamond-like carbon) film is used as a carbon protective film, a structure thereof can be confirmed by a Raman spectrographic analysis. In other words, when the diamond type carbon film is measured, the film can be identified by detecting a peak in a range of from 1520 cm$^{-1}$ to 1560 cm$^{-1}$. When the structure of the carbon film is deviated from the diamond type structure, the peak detected by the Raman spectrographic analysis is deviated from the above-described range and, as a result, hardness as a protective film is decreased.

As carbon materials for forming the carbon protective film, carbon-containing compounds such as alkanes such as methane, ethane, propane and butane; alkenes such as ethylene and propylene; alkines such as acetylene; and the like are preferably used. Further, a carrier gas such as argon or an addition gas such as hydrogen or nitrogen for improving film quality can optionally be added.

When thickness of the carbon protective film is unduly thick, magnetic parametric performance is deteriorated or adhesiveness to the magnetic nanoparticle layer is reduced, while, when thickness thereof is unduly thin, abrasion resistance becomes insufficient. Therefore, the thickness thereof is preferably from 2.5 nm to 20 nm and more preferably from 5 nm to 10 nm.

Further, in order to improve adhesiveness between this protective film and the magnetic nanoparticle layer which becomes a substrate, it is preferable that a surface of the magnetic nanoparticle layer is previously subjected to an etching treatment by an inert gas or exposed to a reactive gas plasma such as that of oxygen to modify the surface.

In order to improve the magnetic parametric performance, the magnetic nanoparticle layer may have a multi-layer structure or may be provided with a known non-magnetic underlayer or an intermediate layer under the magnetic nanoparticle layer. In order to improve a traveling durability and corrosion resistance, as described above, it is preferable that the lubricant or an antirust is provided on the magnetic nanoparticle layer or the protective film. As such lubricants to be used, a known hydrocarbon type lubricant, a fluorine type lubricant, an extreme-pressure additive and the like can be used.

Examples of such hydrocarbon type lubricants include carboxylic acids such as stearic acid and oleic acid; esters such as butyl stearate; sulfonic acids such as octadecyl sulfonic acid; phosphoric acid esters such as monooctadecyl phosphate; alcohols such as stearyl alcohol and oleyl alcohol; carboxylic acid amides such as stearic acid amide; and amines such as stearylamine.

As such fluorine type lubricants, mentioned are lubricants in which a part or all of alkyl groups of the above-described hydrocarbon type lubricants are substituted by a fluoroalkyl group or a perfluoropolyether group.

Examples of such perfluoropolyether groups include a perfluoromethylene oxide polymer, a perfluoroethylene oxide polymer, a perfluoro-n-propylene oxide polymer $(CF_2CF_2CF_2O)_n$, a perfluoroisopropylene oxide polymer $(CF(CF_3)CF_2O)_n$ and copolymers thereof.

Further, compounds having a polar functional group such as an hydroxyl group, an ester group or a carboxyl group at a terminal of an alkyl group or in a molecule of the hydrocarbon type lubricant are favorable due to an excellent effect thereof in reducing frictional force.

Still further, a molecular weight thereof is preferably from 500 to 5000 and more preferably from 1000 to 3000. When the molecular weight is less than 500, there are some cases in which volatility is high or lubricity becomes deteriorated. On the other hand, when the molecular weight is more than 5000, viscosity thereof becomes high whereupon a slider and a disk are liable to be adhered with each other to cause a traveling seize-up or a head crash.

As specific examples of such perfluoropolyethers, FOMBLIN® (available from Ausimont K.K.) and KRYTOX® (available from DuPont K.K.) and the like are available in the market.

Examples of such extreme-pressure additives include phosphoric acid esters such as trilauryl phosphate; thiophosphorous acid esters such as trilauryl trithiophosphite and thiophosphoric esters; and sulfur type extreme-pressure additives such as dibenzyl disulfide.

The lubricants can be used either each individually or in combinations thereof. As for a method of providing any one of the lubricants on the magnetic nanoparticle layer or the protective film, the lubricant is dissolved in a solvent and the resultant solution may be applied thereon by using a wire-bar method, a gravure method, a spin-coat method or a dip-coat method, or adhered thereto by a vapor-deposition method.

Examples of such anti-rusts include nitrogen-containing heterocycles such as benzotriazole, benzimidazole, purine and pyrimidine and derivatives thereof in which an alkyl side chain or the like is incorporated in a mother nucleus thereof; and nitrogen- or sulfur-containing heterocycles such as benzothiazole, 2-mercaptobenzothiazole, a tetrazaindene cyclic compound and a thiouracil compound and derivatives thereof.

As described above, when the magnetic recording medium is magnetic tape or the like, a back coat layer (backing layer) may be provided on a surface on which the magnetic nanoparticle layer of the non-magnetic support is not formed.

The back coat layer is a layer which is provided on a surface on which the magnetic nanoparticle layer of the non-magnetic support is not formed by applying a back coat layer-forming paint in which grain components such as an abrasive, an anti-static agent and the like, and a bonding agent are dispersed in a known organic solvent.

As grain components, various types of inorganic pigments or carbon black can be used, while, as such bonding agents, resins such as nitrocellulose, a phenoxy resin, a vinyl chloride resin and a polyurethane resin can be used either each individually or in combinations thereof.

Further, a known adhesive layer may be provided on a surface on which a nanoparticle dispersion is coated or a surface on which the back coat layer is formed.

Centerline average roughness of the magnetic recording medium to be produced in a manner as described above, at a cutoff value of 0.25 mm, is preferably in a range of from 0.1 nm to 5 nm and more preferably in a range of from 1 nm to 4 nm. The reason of such features is that it is advantageous as a magnetic recording medium for high density recording to allow a surface of the magnetic recording medium to have an extremely excellent smoothness.

As a method of obtaining such a surface, mentioned is a method in which, after the magnetic layer is formed, the thus-formed magnetic layer is subjected to a calendering treatment. Further, a burnishing treatment may be performed.

The resultant magnetic recording medium can be used after it is appropriately punched by a punching machine or cut into a desired size.

EXAMPLES

The following examples are given to illustrate the invention and should not be interpreted as limiting it in any way.
Example of Production Method Comprising Steps of Forming Coated Film and Irradiating Laser Light on Coating Film
Preparation of Coating Liquid Containing Nanoparticles
Coating Liquid (1) Carbonyl Method:

An operation described below has been conducted in an atmosphere of a high purity Ar gas.

0.5 mmol of palladium (II) acetyl acetate [$CH_3COCH=C(O-)CH_3$]$_2$Pd, 1.5 mmol of 1,2-hexadecane diol and 20 ml of dioctyl ether were mixed thereamong and, then, heated at 100° C. To the resultant mixture, 0.5 mmol of oleic acid, 0.5 mmol of oleylamine and 1 mmol of Fe(CO)$_5$ were further added and, then, heated at 100° C. for 30 minutes and, thereafter, refluxed at 297° C. for 30 minutes. After cooled, the thus-refluxed mixture was added with 40 ml of ethanol to cause precipitation whereupon a supernatant was removed to obtain a precipitate.

To the thus-obtained precipitate, 0.16 mmol of oleic acid and 0.15 mmol of oleylamine were further added and, then, still further added with 25 ml of hexane to allow the precipitate to be dispersed. The resultant dispersion was further added with 20 ml of ethanol to cause precipitation whereupon a supernatant was removed to obtain a precipitate.

To the thus-newly-obtained precipitate, 0.16 mmol of oleic acid and 0.15 mmol of oleylamine were further added and, then, still further added with 20 ml of hexane to allow the precipitate to be dispersed. The resultant dispersion was added with 15 ml of ethanol to cause precipitation whereupon a supernatant was removed to obtain a precipitate.

To the precipitate thus still newly obtained, 0.16 mmol of oleic acid and 0.15 mmol of oleylamine were further added and, then, still further added with 20 ml of hexane to prepare a coating liquid (1) containing nanoparticles comprising Fe—Pd.

Coating Liquid (2) Carbonyl Method:

An operation described below has been conducted in an atmosphere of a high purity Ar gas.

0.5 mmol of platinum (II) acetyl acetate [$CH_3COCH=C(O-)CH_3$]$_2$Pt, 1.5 mmol of 1,2-hexadecane diol and 20 ml of dioctyl ether were mixed thereamong and, then, heated at 100° C.

To the resultant mixture, 0.5 mmol of oleic acid, 0.5 mmol of oleylamine and 1 mmol of Fe(CO)$_5$ were added and, then, refluxed at 297° C. for 30 minutes. After cooled, the thus-refluxed mixture was added with 40 ml of ethanol to cause precipitation whereupon a supernatant was removed to obtain a precipitate.

To the thus-obtained precipitate, 0.16 mmol of oleic acid and 0.15 mmol of oleylamine were added and, then, further added with 25 ml of hexane to allow the precipitate to be dispersed. The resultant dispersion was added with 20 ml of ethanol to cause precipitation whereupon a supernatant was removed to obtain a precipitate.

To the thus-newly-obtained precipitate, 0.16 mmol of oleic acid and 0.15 mmol of oleylamine were added and, then, further added with 20 ml of hexane to allow the precipitate to be dispersed. The resultant dispersion was added with 15 ml of ethanol to cause precipitation whereupon a supernatant was removed to obtain a precipitate.

To the precipitate thus still newly obtained, 0.16 mmol of oleic acid and 0.15 mmol of oleylamine were added and, then, further added with 20 ml of hexane to prepare a coating liquid (2) containing nanoparticles comprising Fe—Pt.

Identification of Nanoparticles

The thus prepared coating liquids (1) and (2) were placed on a mesh for a TEM observation and dried to prepare respective TEM samples. A particle size was determined by using a transmission electron microscope (TEM) having an acceleration voltage of 300 KV (available from Hitachi, Ltd.). As a result, it was confirmed that an average volume particle diameter of nanoparticles in each coating liquid was 5 nm.

A Pd/Fe and a Pt/Fe ratios in entire nanoparticles in respective coating liquids (1) and (2) were determined, respectively, by using an ICP (tradename: SPS1200A; available from Seiko Instruments, Inc.). As a result, the Pd/Fe ratio in the coating liquid (1) was 0.98, while the Pt/Fe ratio in the coating liquid (2) was 1.03.

Example 1

A coating liquid (2) containing 0.04 mg/l of Pt—Fe nanoparticles was applied on a PPTA film (polyparaphenylene terephthalamide; trade name: ARAMICA; available from Asahi Kasei Corp.) having a thickness of 40 µm such that Pt—Fe nanoparticles are allowed to be in a quantity of 0.5 g/m$^2$ and dried to form a coating film.

The thus-formed coating film was irradiated by laser light under conditions described below to form a nanoparticle layer, thereby preparing a nanoparticle coated material.

| Ar laser: | wavelength: 488 nm |
|---|---|
| Laser beam diameter: | 25 µm dia. |
| Linear velocity: | 5 m/s |
| Power: | 0.3 W |

Example 2

A nanoparticle coated material was prepared in a same manner as in Example 1 except that the coating liquid (2)

was changed into the coating liquid (1) (Pd—Fe nanoparticles: 0.04 mg/ml).

Example 3

A nanoparticle coated material was prepared in a same manner as in Example 1 except that conditions of laser irradiation were changed to those described below.

| Alexandrite laser: | wavelength: 780 nm |
| Laser beam diameter: | 60 μm dia. |
| Linear velocity: | 5 m/s |
| Power: | 0.5 W |

Example 4

A nanoparticle coated material was prepared in a same manner as in Example 2 except that conditions of laser irradiation were changed to those in Example 3.

Example 5

A laser light absorption layer having a thickness of 50 nm was formed on a support and, then, a coating film containing nanoparticles was formed on the thus-formed laser light absorption layer in a same manner as in Example 1 and, thereafter, the thus-formed coating film was irradiated by laser light to form a nanoparticle layer, thereby preparing a nanoparticle coated material.

Further, the above-described laser light absorption layer was formed in a manner as described below. Namely, a DMF (dimethyl formamide) solution containing 10 mass percent of a dye (A), as a laser light absorbing agent, which is represented by the chemical formula (1) described below was applied on a support in a quantity of 0.2 ml/cm$^2$ and dried at 80° C. to form the laser light absorption layer.

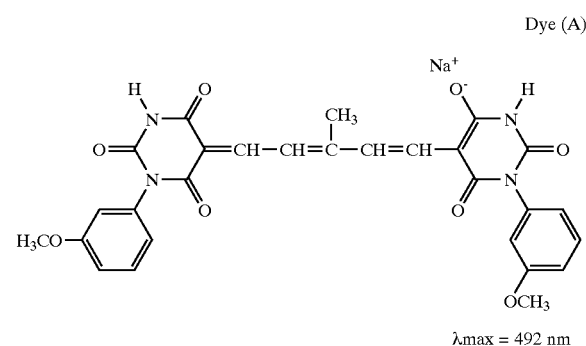

Dye (A)

λmax = 492 nm

Example 6

A nanoparticle coated material was prepared in a same manner as in Example 5 except that the coating liquid (2) was changed into the coating liquid (1) (Pd—Fe nanoparticles: 0.04 mg/ml).

Example 7

A laser light absorption layer having a thickness of 50 nm was formed on a support and, then, a coating film containing nanoparticles was formed on the thus-formed laser light absorption layer in a same manner as in Example 3 and, thereafter, the thus-formed coating film was irradiated by laser light to form a nanoparticle layer, thereby preparing a nanoparticle coated material.

Further, the above-described laser light absorption layer was formed in a manner as described below. Namely, a DMF (dimethyl formamide) solution containing 10 mass percent of a dye (B), as a laser light absorbing agent, which is represented by the chemical formula (2) described below was applied on a support in a quantity of 0.2 ml/cm$^2$ and dried at 80° C. to form the laser light absorption layer.

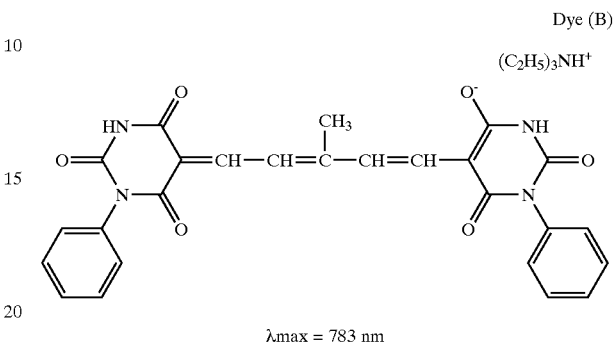

Dye (B)

λmax = 783 nm

Example 8

A nanoparticle coated material was prepared in a same manner as in Example 7 except that the coating liquid (2) was changed into the coating liquid (1) (Pd—Fe nanoparticles: 0.04 mg/ml).

Comparative Example 1

A coating liquid (2) containing 5 mg/ml of Pt—Fe nanoparticles was applied on a PPTA film (polyparaphenylene terephthalamide; trade name: ARAMICA; available from Asahi Kasei Corp.) having a thickness of 40 μm in a quantity of 0.04 ml/cm$^2$ and dried to form a coating film. Thereafter, the thus-formed coating film was heated by an electric furnace at 600° C. for 10 minutes in an atmosphere of $N_2$ gas to form a nanoparticle layer, thereby preparing a nanoparticle coated material.

Comparative Example 2

A coating liquid (1) containing 5 mg/ml of Pd—Fe nanoparticles was applied on a PPTA film (polyparaphenylene terephthalamide; trade name: ARAMICA; available from Asahi Kasei Corp.) having a thickness of 40 μm in a quantity of 0.04 ml/cm$^2$ and dried to form a coating film. Thereafter, the thus-formed coating film was heated by an electric furnace at 600° C. for 10 minutes in an atmosphere of $N_2$ gas to form a nanoparticle layer, thereby preparing a nanoparticle coated material.

Evaluation of Characteristics (1) X-ray Diffraction

By using a spatula, nanoparticles were scraped off a sample piece of a nanoparticle coated material which has been irradiated by laser or heated by an electric furnace onto a non-reflective quartz board for placing a sample thereon such that no strain was generated in the nanoparticles and, then, dried to prepare a sample for X-ray diffraction.

X-ray diffraction was performed on the thus-prepared sample by a powder method using a goniometer while Cu Kα ray is generated by an X-ray diffraction apparatus (available from Rigaku Corporation) under the conditions of tube voltage: 50 KV; and tube current: 300 mA. Difference between the disordered phase and the ordered phase was determined based on a crystalline structure. The results are shown in Table 1.

(2) Magnetic Characteristics

In regard to magnetic characteristics of nanoparticles in each of Examples 1 to 8 and Comparative Examples 1 and 2, an Hc was measured by using a high sensitive magnetization vector measuring apparatus (available from Toei Industry Co., Ltd.) and a DATA processor (available from Toei Industry Co., Ltd.) under the condition of an applied magnetic field of 790 kA/m (10 kOe). The results are shown in Table 1.

TABLE 1

| | Particle composition | Dye | Heating method | Linear velocity | Structure | Hc(kA/m) | |
|---|---|---|---|---|---|---|---|
| Example 1 | FePt | — | Ar laser | 5 m/s | ordered phase | 169.85 | (2150 Oe) |
| Example 2 | FePd | — | Ar laser | 5 m/s | ordered phase | 158 | (2000 Oe) |
| Example 3 | FePt | — | alexandrite laser | 5 m/s | ordered phase | 172.22 | (2180 Oe) |
| Example 4 | FePd | — | alexandrite laser | 5 m/s | ordered phase | 150.1 | (1900 Oe) |
| Example 5 | FePt | (A) | Ar laser | 5 m/s | ordered phase | 240.95 | (3050 Oe) |
| Example 6 | FePd | (A) | Ar laser | 5 m/s | ordered phase | 225.15 | (2850 Oe) |
| Example 7 | FePt | (B) | alexandrite laser | 5 m/s | ordered phase | 252.8 | (3200 Oe) |
| Example 8 | FePd | (B) | alexandrite laser | 5 m/s | ordered phase | 221.2 | (2800 Oe) |
| Comparative Example 1 | FePt | — | electric furnace | — | ordered phase | 252.8 | (3200 Oe) |
| Comparative Example 2 | FePd | — | electric furnace | — | ordered phase | 229.1 | (2900 Oe) |

It was confirmed that, in Examples 1 to 8 and Comparative Examples 1 and 2, nanoparticles are of the ordered phase and have excellent magnetic characteristics. However, it was also confirmed that, in Comparative Examples 1 and 2, since heating by the electric furnace was conducted, each support comprising an organic substance was carbonized whereby the products can not be put to practical use.

Example by Production Method Comprising Step of Forming Shielding Layer

Preparation of Nanoparticle Dispersion Containing FePt Nanoparticles

An operation described below has been conducted in an atmosphere of a high purity Ar gas.

0.64 mmol of iron (III) acetyl acetate [$CH_3COCH=C(O-)CH_3$]$_3$Fe, 1.5 mmol of 1,2-hexadecane diol and 20 ml of dioctyl ether were mixed thereamong and, then, heated at 100° C. To the resultant mixture, 0.5 mmol of oleic acid and 0.5 mmol of oleylamine were further added and, then, heated at 200° C. for 30 minutes and, thereafter, refluxed (A liquid).

0.5 mmol of platinum (II) acetyl acetate [$CH_3COCH=CC(O-)CH_3$]$_2$Pt, 1.5 mmol of 1,2-hexadecane diol and 20 ml of dioctyl ether were mixed thereamong and, then, heated at 100° C. and, thereafter, cooled to 100° C. The resultant A liquid was added to the resultant cooled liquid and refluxed at 297° C. for 30 minutes. After cooled, 40 ml of ethanol was added to the thus-cooled refluxed mixture to cause precipitation whereupon a supernatant was removed to obtain a precipitate.

To the thus-obtained precipitate, 0.16 mmol of oleic acid and 0.15 mmol of oleylamine were added and, then, further added with 25 ml of hexane to allow the precipitate to be dispersed. The resultant dispersion was further added with 20 ml of ethanol to cause precipitation whereupon a supernatant was removed to obtain a precipitate.

To the thus-newly-obtained precipitate, 0.16 mmol of oleic acid and 0.15 mmol of oleylamine were added and, then, further added with 20 ml of hexane to allow the precipitate to be dispersed. The resultant dispersion was added with 15 ml of ethanol to cause precipitation whereupon a supernatant was removed to obtain a precipitate.

To the precipitate thus still newly obtained, 0.16 mmol of oleic acid and 0.15 mmol of oleylamine were added and, then, further added with 20 ml of hexane to prepare a nanoparticle dispersion in which nanoparticles are dispersed.

Identification of Nanoparticles

The thus prepared nanoparticle dispersion was placed on a mesh for a TEM observation and dried to prepare a TEM sample. A particle size thereof was determined by using a transmission electron microscope (TEM) having an acceleration voltage of 300 KV (available from Hitachi, Ltd.). As a result, presence of nanoparticles having a diameter of 5 nm was confirmed.

Example 9

A glass substrate (thickness: 1 mm) having an outer diameter of 60 nm and an inner diameter of 30 nm is allowed to be a support and a shielding layer (thickness: 5 nm) comprising Al was formed on the support by sputtering under the following conditions:

| | |
|---|---|
| Atmosphere: | Ar gas |
| Sputtering pressure: | 399 × 10$^3$ Pa (3 × 10$^3$ Torr) |
| RF power: | 500 W |

Next, an operation described below has been conducted in an atmosphere of $N_2$ gas.

The prepared nanoparticle dispersion was applied on a shielding layer by a spin coater such that nanoparticles are allowed to be in a quantity of 0.5 mg/m$^2$ and, then, dried and, thereafter, heated (annealed) by an electric furnace at 550° C. for 30 minutes to form a nanoparticle layer (thickness: 0.1 μm), thereby preparing a magnetic recording medium.

X-ray Diffraction

By using a spatula, nanoparticles were only scraped off from the thus prepared magnetic recording medium placed onto anon-reflective quartz board such that no strain was generated, placed and, then, dried to prepare a sample for X-ray diffraction.

X-ray diffraction was performed on the thus-prepared sample by using a goniometer while Cu Kα ray is generated by an X-ray diffraction apparatus (available from Rigaku Corporation) under the conditions of tube voltage: 50 KV; and tube current: 300 mA. Difference between the disordered phase and the ordered phase was determined based on a crystalline structure. The results are shown in Table 2.

Magnetic Characteristics

Magnetic characteristics (coercive force: Hc) of the prepared magnetic recording medium was evaluated. The magnetic characteristics were measured by using a high sensitive magnetization vector measuring apparatus (available from Toei Industry Co., Ltd.) and a DATA processor (available from Toei Industry Co., Ltd.) under the condition of an applied magnetic field of 790 kA/m (10 kOe).

Example 10

The magnetic recording medium was prepared in a same manner as in Example 9 except that carbon was used as a material for the shielding layer whereupon evaluation of X-ray diffraction and magnetic characteristics were performed. The results are shown in Table 2.

Example 11

The magnetic recording medium was prepared in a same manner as in Example 1 except that carbon was used as a material for the shielding layer whereupon evaluation of X-ray diffraction and magnetic characteristics were performed. The results are shown in Table 2.

Comparative Example 3

The magnetic recording medium was prepared in a same manner as in Example 1 except that the shielding layer was not formed whereupon evaluation of X-ray diffraction and magnetic characteristics were performed. The results are shown in Table 2.

Comparative Example 4

The magnetic recording medium was prepared in a same manner as in Example 1 except that the shielding layer was not formed and the annealing temperature was allowed to be 800° C. whereupon evaluation of X-ray diffraction and magnetic characteristics were performed. The results are shown in Table 2.

TABLE 2

|  | Material of shielding layer | Annealing temperature | Hc | Crystalline structure |
| --- | --- | --- | --- | --- |
| Example 9 | Al | 550° C. | 426.6 kA/m (5400 Oe) | ordered phase |
| Example 10 | carbon | 550° C. | 418.7 kA/m (5300 Oe) | ordered phase |
| Example 11 | Pt | 550° C. | 450.3 kA/m (5700 Oe) | ordered phase |
| Comparative Example 3 | none | 550° C. | 1.975 kA/m (25 Oe) | disordered phase |
| Comaparative Example 4 | none | 800° C. | 442.4 kA/m (5600 Oe) | ordered phase |

In the magnetic recording media in Examples 9 to 11, the nanoparticles (Pt—Fe particles) are of the ordered phase and exhibited high coercive force. On the other hand, in Comparative Example 3 in which the shielding layer was not formed, the nanoparticles are of disordered phase and exhibited low coercive force. It is considered that such feature is attributable to the fact that Si in the glass substrate was diffused in the nanoparticle layer.

Further, in Comparative Example 4 in which the shielding layer was not formed and the annealing temperature was allowed to be high, the nanoparticles are of the ordered phase and exhibited high coercive force; however, the substrate was deformed to a great extent whereupon the product was not put to practical use. From the results thus obtained, it is found that, according to the magnetic recording media (Examples 9 to 11) of the invention, the hard ordered alloy can efficiently be obtained without elevating the transformation temperature.

What is claimed is:

1. A method of producing a nanoparticle coated material, including a support and a nanoparticle layer formed on the support, wherein the nanoparticle layer contains nanoparticles, which include a CuAu-type or $Cu_3Au$-type hard magnetic ordered alloy, and wherein the method satisfies at least one of the following conditions (i) and (ii):
    (i) the method comprises a step of forming a shielding layer on the support before forming the nanoparticle layer; and
    (ii) a step of forming the nanoparticle layer comprises the steps of: applying a coating liquid containing nanoparticles consisting of an alloy having a disordered phase and having at least two metals having different oxidation-reduction potentials on the support to form a coating film; and irradiating laser light on the coating film.

2. A method of producing a nanoparticle coated material, comprising the steps of forming a coating film by applying a coating liquid containing nanoparticles capable of forming a CuAu-type or $Cu_3Au$-type hard magnetic ordered alloy phase on a support; and a forming step of forming a nanoparticle layer by irradiating laser light on the coating film.

3. The method of claim 2, wherein the coating liquid is caused to include a laser light absorbing agent.

4. The method of claim 2, further comprising a step of forming, before the coating film forming step, a laser light absorption layer containing a laser light absorbing agent on a side of the support on which the coating film is formed.

5. The method of claim 3, further comprising a step of forming, before the coating film forming step, a laser light absorption layer containing a laser light absorbing agent on a side of the support on which the coating film is formed.

6. The method of claim 1, wherein coercive force of the nanoparticles is from 95.5 kA/m to 398 kA/m, a particle diameter of the nanoparticles is from 1 nm to 100 nm and standard deviation of the particle diameters is less than 10%.

7. The method of claim 3, wherein the laser light absorbing agent comprises at least one compound selected from the group consisting of compounds represented by the following general formulas (I), (II) and (III):

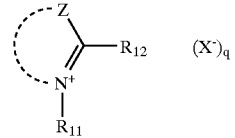

General formula (I)

wherein Z represents a non-metallic atomic group necessary to complete a 5- or 6-membered nitrogen-containing heterocycle;

$R_{11}$ represents any one member selected from the group consisting of a hydrogen atom, an alkyl group, an alkenyl group, a substituted alkyl group and a substituted alkenyl group;

$R_{12}$ represents any one member selected from the group consisting of a hydrogen atom, a lower alkyl group and a substituted alkyl group;

X represents an acid anion; and q represents an integer of from 0 to 2;

General formula (II)

$D$-$(X)_y$ wherein D represents a compound having a chromophore;

X represents a dissociative proton combined with D either directly or via a divalent connecting group, or a group having a dissociative proton; and y represents an integer of from 1 to 7; and General formula (III)

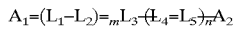

wherein $A_1$ and $A_2$ each represent an acid nucleus necessary to form an oxonol dye; and m and n each represent an integer of 0 or 1.

8. The method of claim 4, wherein the laser light absorbing agent comprises at least one compound selected from the group consisting of compounds represented by the following general formulas (I), (II) and (III):

General formula (I)

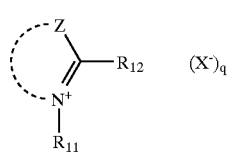

wherein Z represents a non-metallic atomic group necessary to complete a 5- or 6-membered nitrogen-containing heterocycle;

$R_{11}$ represents any one member selected from the group consisting of a hydrogen atom, an alkyl group, an alkenyl group, a substituted alkyl group and a substituted alkenyl group;

$R_{12}$ represents any one member selected from the group consisting of a hydrogen atom, a lower alkyl group and a substituted alkyl group;

X represents an acid anion; and q represents an integer of from 0 to 2;

General formula (II)

wherein D represents a compound having a chromophore;

X represents a dissociative proton combined with D either directly or via a divalent connecting group, or a group having a dissociative proton; and y represents an integer of from 1 to 7; and General formula (III)

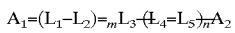

wherein $A_1$ and $A_2$ each represent an acid nucleus necessary to form an oxonol dye; and m and n each represent an integer of 0 or 1.

9. The method of claim 1, further comprising the steps of:

forming the shielding layer on the support; and forming the nanoparticle layer on the shielding layer, wherein the nanoparticle layer contains nanoparticles comprising a CuAu-type or $Cu_3Au$-type hard magnetic ordered alloy.

10. A nanoparticle coated material, comprising a support, a shielding layer formed on the support and a nanoparticle layer formed on the shielding layer, wherein the nanoparticle layer comprises nanoparticles comprising a CuAu-type or $Cu_3Au$-type hard magnetic ordered alloy.

11. The nanoparticle coated material of claim 10, wherein a thickness of the shielding layer is from 3 nm to 1 μm.

* * * * *